May 25, 1926.
H. LEITCH
1,585,727
PICK-UP APPARATUS FOR ROOT LOADERS
Original Filed March 10, 1925
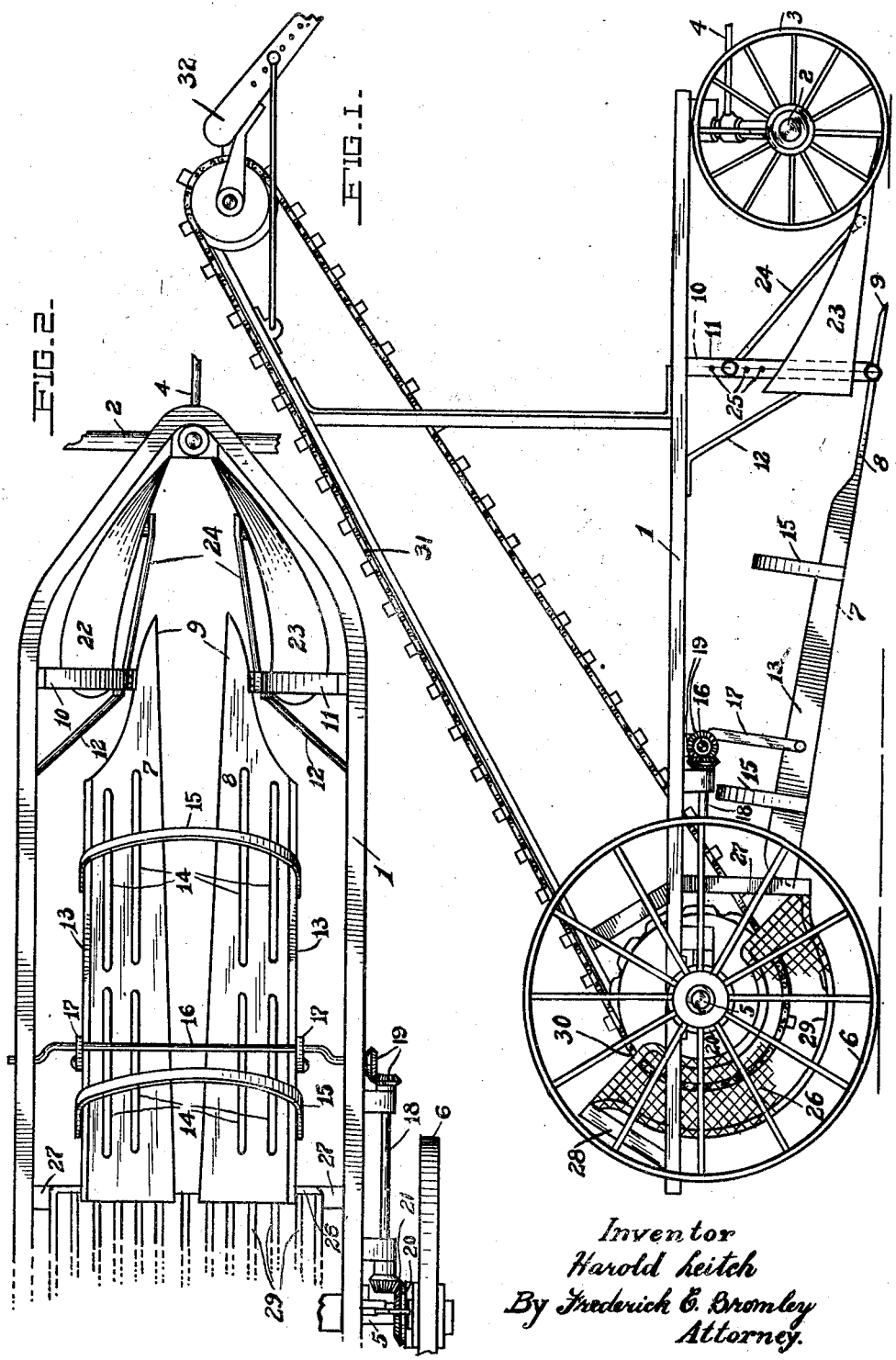
Inventor
Harold Leitch
By Frederick E. Bromley
Attorney.

Patented May 25, 1926.

1,585,727

UNITED STATES PATENT OFFICE.

HAROLD LEITCH, OF HORNINGS MILLS, ONTARIO, CANADA.

PICK-UP APPARATUS FOR ROOT LOADERS.

Original application filed March 10, 1925, Serial No. 14,578. Divided and this application filed December 23, 1925. Serial No. 77,275.

The invention relates to improvements in pick-up apparatus for root loaders as described in the present specification and shown in the accompanying drawings which form part of the same.

This application is a division of my application for improvements in "combined root puller and loader", Serial Number 14,578, filed March 10th, 1925, and relates to machines for use in harvesting root crops, specially adapted for turnips, mangel and sugar beet roots which have had their foliage previously severed in order that their roots may be extracted and loaded in a wagon by which the contrivance is drawn.

The object of the present invention is to devise an improved pick-up apparatus for the purpose of uprooting roots and jigging them into a basket, or other receptacle, from where they are subsequently delivered by the conveyor to the wagon by which the machine is drawn.

The invention consists mainly of a pair of pick-up arms forwardly terminating in prongs for uprooting roots, the arms to the rear of the prongs being vibrated in order to jig roots along to the basket of the machine for subsequent elevation; ears being provided at the front of the prongs for brushing aside previously cut foliage of the roots, thus diverting this foliage from the pathway of the prongs and leaving only the roots themselves to be garnered.

Referring to the drawings: Figure 1 is a side elevation of the machine embodying the invention.

Figure 2 is a partial plan view of Figure 1, the basket and the conveyor being omitted in order to give prominence to the invention itself.

Like numerals of reference indicate corresponding parts in each figure throughout the drawings.

In the drawings, the reference numeral 1 indicates the frame of the running gear, which may be of any suitable design. At the front of the frame is a swiveled axle 2, mounted upon road wheels 3, and extending from the axle is a draft bar 4 whereby the machine is hitched to the wagon to be loaded.

At the rear of the frame is an axle 5 suitably journalled thereto and provided with wheels, as at 6.

Intermediate of the front and rear wheels is the pick-up apparatus which comprises a pair of forwardly inclined pick-up arms 7 and 8 which terminate at their forward ends in prongs 9 for penetrating the soil on each side of the roots to be uplifted. These prongs are pivotally supported from the frame by depending brackets 10 and 11 which are fixedly secured in any manner found convenient and braced by members 12. The inner marginal edges of the pick-up members 7 and 8 rearwardly converge in order that the roots may be gradually raised from the soil and deposited upon such members without injury to themselves. The said members are provided with sides 13, and longitudinal perforations 14 for the purpose of allowing the loose soil to filter through and fall upon the ground.

15 are arcuate straps extending transversely of the pick-up members and fixedly secured to their sides in order to hold them in their spaced relationship. 16 is a transverse crankshaft of a very slight offset or throw, journalled in the frame 1 and connected to the rear end of the pick-up members 7 and 8 by a pair of bars 17: these bars are journalled on said shaft at their upper ends and pivotedly connected to the sides 13 of the pick-up members at their lower ends.

18 is a further shaft extending on one side of the frame from the rear axle 5 to the crankshaft 16 and journalled in the frame. This shaft is connected by a pair of meshing bevel gears 19 to said crankshaft and operably connected to the bevel gear 20 by a single bevel gear 21.

It may be here remarked that the bevel gear 20 may be directly connected to the adjacent road wheel for taking off power, or indirectly connected thereto by means of a clutch, as disclosed in my former application above referred to. When a clutch is employed, the pick-up apparatus may be controlled independently of the road wheel by which it is driven.

It will be clearly manifest that when power is being taken off by the driving road wheel by means of the bevel gear 20, the shaft 18 is rotated, and as this shaft is geared to the crankshaft 16 the same will be operated thereby, in this manner reciprocating the bars 17, which, in turn, agitate the pick-up members 7 and 8.

22 and 23 are a pair of ears pivotally connected to the brackets 10 and 11 at their rear ends and adjustably supported at their forward ends by oblique bars 24 which are pivotally connected to the ears in any manner found convenient and bolted to their respective brackets 10 and 11 in one of a series of longitudinally arranged apertures 25.

These ears incline towards each other at their forward ends and are so shaped that as they encounter the previously cut foliage of the roots lying upon the ground surface, they will brush same outwardly away from the prongs 9 of the pick-up members, thus preventing them from being gathered with the roots. The forward ends of the ears are adjusted to any desired gradient by bolting them in any one of the series of above referred to apertures 25.

26 designates the basket, which is tilted at an acute angle at the rear end of the frame and is suspended at its forward end by members 27 rigidly secured to the frame and further carried at its rear end by members 28. This basket, or receptacle, is constructed of a plurality of semi-circular bars, as at 29, outwardly offset at their ends. These bars are spaced a suitable distance from one another in order that roots contained within the basket may not slip therethrough.

Located within this basket is the receiving end 30 of the endless conveyor 31, which receiving end takes roots from the basket and elevates them to the chute 32, from where they are precipitated into the wagon preceding the loader.

Contained within the basket is rack mechanism for feeding the roots onto the conveyor, which mechanism is not shown in the drawings since it does not form a part of the present invention; however, an ample disclosure of a suitable rack mechanism together with a basket and elevator is disclosed in my application for improvements in "combined root puller and loader" heretofore referred to and of which the present application is a division.

What I claim is:—

1. In a device of the class described, a pick-up apparatus comprising a pair of forwardly inclined pick-up arms having converging inner edges and each terminating in a prong for penetration of the soil on opposing sides of roots to be uplifted, stationary members pivotally supporting said prongs, means for securing said pick-up arms one to the other in spaced relation, and means for imparting a vibratory motion to the rear of the pick-up arms.

2. In a device of the class described, a pick-up apparatus comprising a pair of forwardly inclined pick-up arms having converging inner edges and each terminating in a prong for penetration of the soil on opposing sides of roots to be uplifted, stationary members pivotally supporting said prongs, means securing said pick-up arms one to the other in spaced relation, bars suspending the rear of said pick-up arms, and a transverse shaft having cranks connected to the said bars.

Signed at Hornings Mills, Ontario, Canada, the 10th day of Dec., 1925.

HAROLD LEITCH.